June 1, 1954    W. L. REMICK    2,679,934
APPARATUS FOR SEPARATING MIXED MATERIALS
Filed Dec. 24, 1948    3 Sheets-Sheet 1

Inventor
WALTER L. REMICK
By Ogle R. Singleton,
Atty.

June 1, 1954 W. L. REMICK 2,679,934
APPARATUS FOR SEPARATING MIXED MATERIALS
Filed Dec. 24, 1948 3 Sheets-Sheet 2
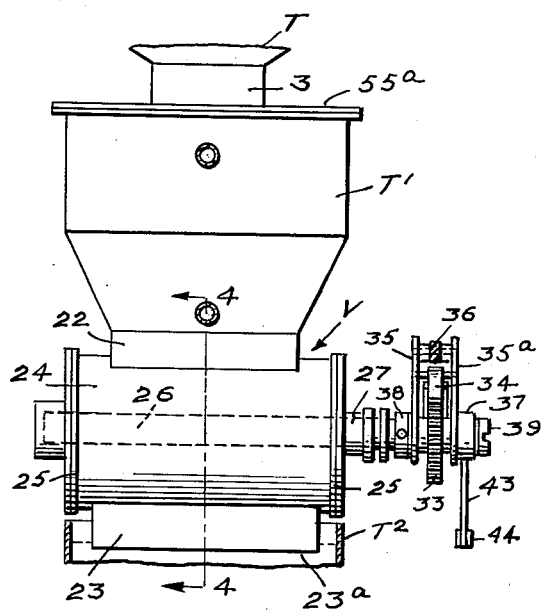
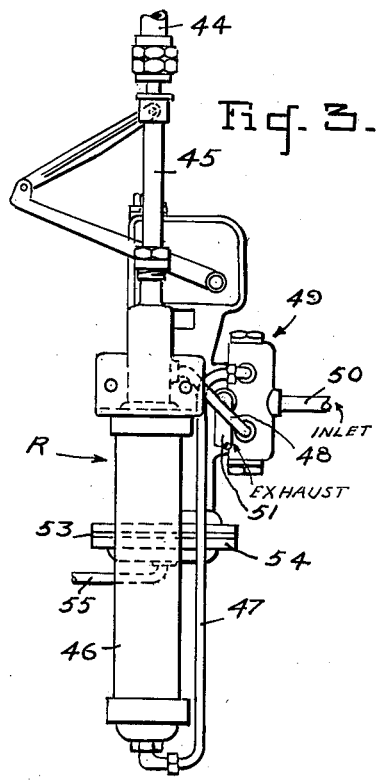
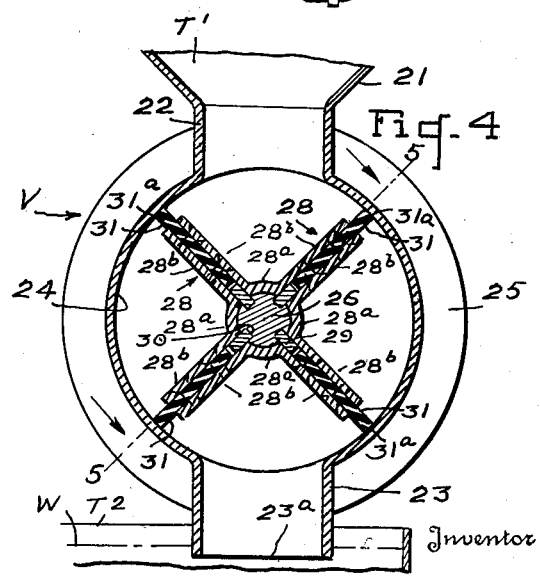
Inventor
WALTER L. REMICK
By Ogle R. Singleton,
Atty.

June 1, 1954 W. L. REMICK 2,679,934
APPARATUS FOR SEPARATING MIXED MATERIALS
Filed Dec. 24, 1948 3 Sheets-Sheet 3
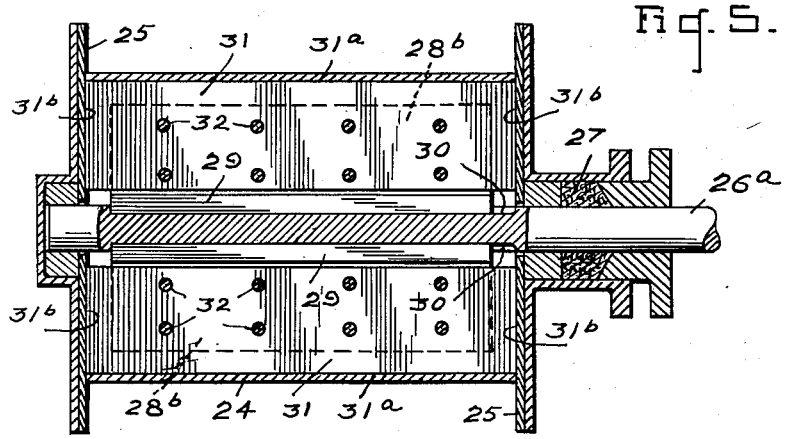
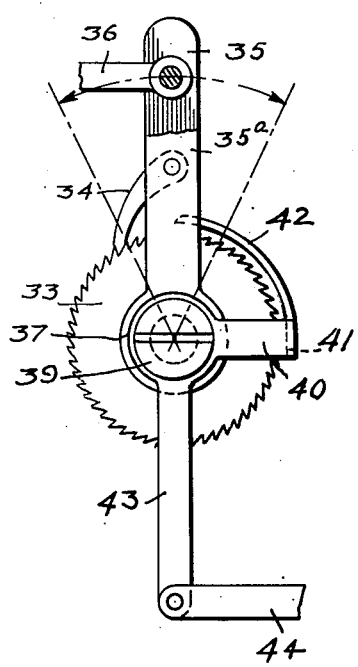
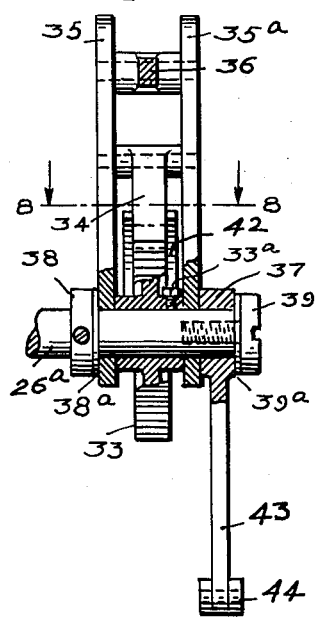
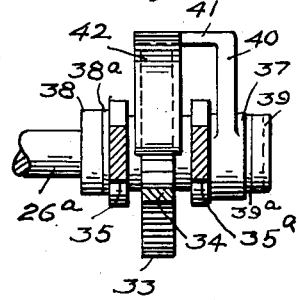
Inventor
WALTER L. REMICK
By Ogle R. Singleton,
Atty.

Patented June 1, 1954

2,679,934

UNITED STATES PATENT OFFICE 2,679,934

APPARATUS FOR SEPARATING MIXED MATERIALS

Walter L. Remick, Evanston, Ill., assignor to Hydrotator Company, Evanston, Ill., a corporation of Delaware Application December 24, 1948, Serial No. 67,199

1 Claim. (Cl. 209—159)

My invention consists in a new and useful improvement in apparatus for separating mixed materials and is designed for separating materials of different specific gravities, and more particularly for ore concentration, and cleaning coal. The process hereinafter fully disclosed comprises an improvement upon my process described and claimed in United States Letters Patent Number 2,288,744 granted on July 7, 1942. The process of the said patent comprises segregating overflow and underflow products by hydraulic classification in each of three stages of the process, the first being accomplished by circulation of a fluid medium, the second by an extraneous regulated current of a fluid medium, and the third by a second extraneous current of a fluid medium automatically controlled by fluctuations in density of the circulated fluid medium. The process hereinafter disclosed includes the first and second of the aforesaid stages, and a considerably modified third stage. Experience has shown that while the aforesaid second extraneous current tends to prevent the escape with the underflow of residual light particles which had not been removed in the prior stages, the utility of said second current is minimized by the fact that having functioned as designed this second current agitates the classifying column of said first and second stages, thereby vitiating in some degree its design effect. The said modified third stage of my improved process consists in the controlled discharge of the underflow product of said second stage, so effected that the volume of removed solids is replaced by a corresponding volume of water, preventing ingress of air and any disturbance of the classifying column by a current of water. Such discharge is automatically controlled in dependence upon the fluctuations in density of the circulated fluid medium of the first stage.

The apparatus by which my improved process can be practiced, as illustrated in the drawings and hereinafter fully described, while having many of the structural details disclosed and claimed in the aforesaid patent, No. 2,288,744, comprises a considerable number of novel structural details. The particularly novel features are the discharge means comprising a novel form of valve, discharge conduit and disposal tank, and the regulator with its control mechanism for the valve.

While I have illustrated in the drawings and have hereinafter fully described one specific embodiment of my improved apparatus by which the process can be practiced, it is to be distinctly understood that I do not consider my invention to be limited thereby, and refer for its scope to the claim appended hereto.

In the drawings:

Fig. 2 is an enlarged fragmentary side elevation, on the line 2—2 of Fig. 1, in the direction of the arrows.

Fig. 3 is a greatly enlarged elevation of the regulator shown in Fig. 1.

Fig. 4 is a greatly enlarged vertical section on the line 4—4 of Fig. 2, in the direction of the arrows.

Fig. 5 is a section on the line 5—5 of Fig. 4, in the direction of the arrows.

Fig. 6 is an enlarged fragmentary elevation of the valve operating mechanism.

Fig. 7 is a side elevation, partly in section, of the mechanism of Fig. 6.

Fig. 8 is a horizontal section on the line 8—8 of Fig. 7, in the direction of the arrows.

Figure 1:
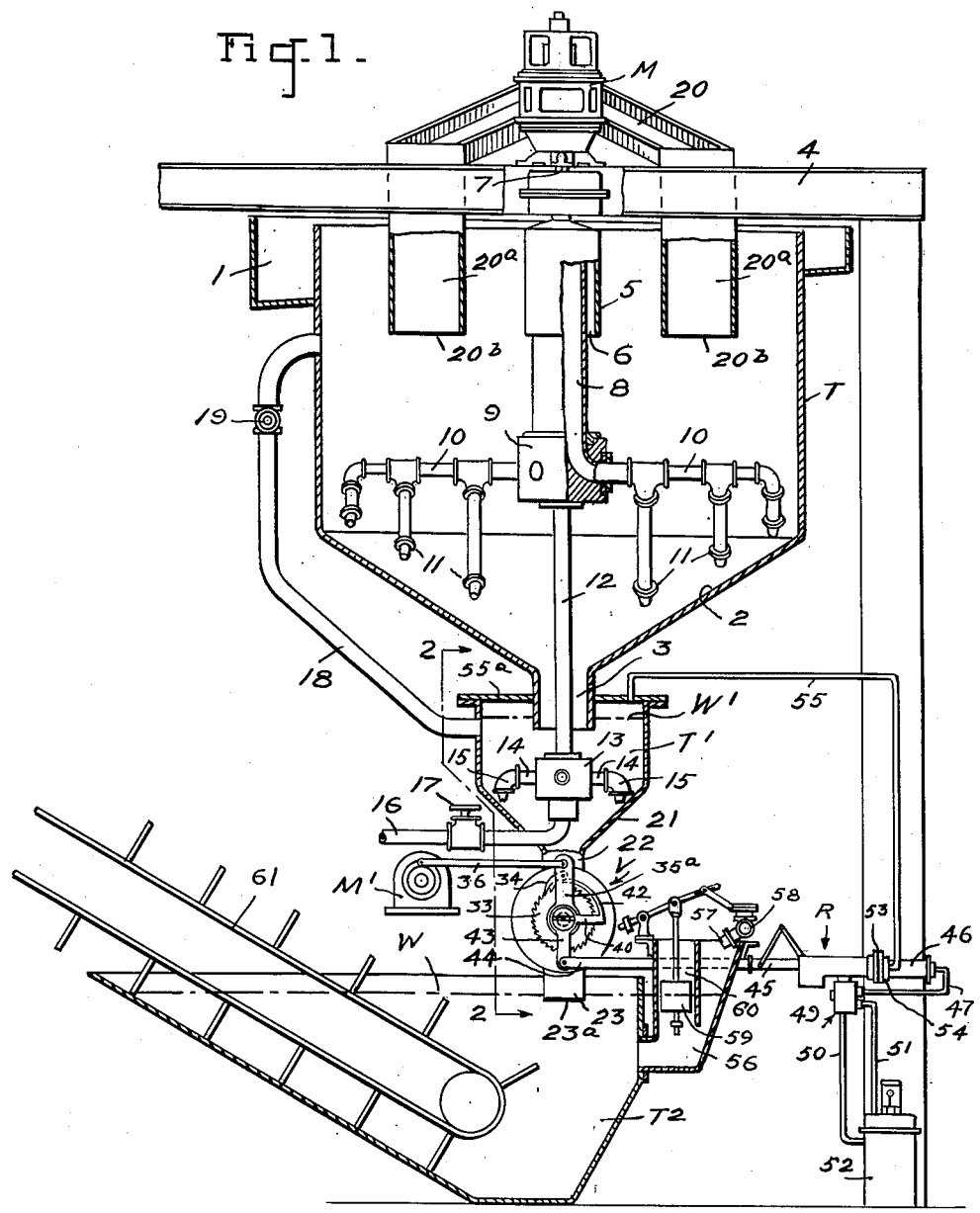
Fig. 1 is a vertical section of my apparatus.

As illustrated in the drawings, the apparatus has a main tank T with an overflow launder 1 and a sloping bottom 2 in the center of which is a discharge pipe 3 entering an auxiliary tank T-1 disposed below the main tank T. Suitably mounted on beams 4 over the tank T there is a rotatable casing 5 having its lower open end 6 in the tank T. Suitably mounted on the beams 4 there is a motor M with a shaft 7 carrying a suitable impeller head (not shown) disposed in the casing 5. Received within the casing 5 and rotatably carried thereby there is a discharge pipe 8 with a distributor head 9 to which are attached radial pipes 10 having downwardly extended tangential nozzles 11 disposed adjacent the bottom 2 of the tank T. A shaft 12 extends downwardly from the head 9 through the pipe 3 into the auxiliary tank T-1, carrying a rotatable distributing head 13 to which are attached radial pipes 14 having downwardly extended tangential nozzles 15. A supply pipe 16 with a valve 17 passes into the tank T-1 and communicates through the head 13 with pipes 14 and nozzles 15. A discharge pipe 18 passes out of the upper part of the tank T-1 and enters the upper part of the tank T, having a control valve 19.

The mixed materials are fed into the main tank T by a Y-shaped supply chute 20 with feed wells 20-a extended downwardly into the tank T, their discharge ends 20-b being in the horizontal plane of the end 6 of the casing 5.

The tank T-1 has a sloping bottom 21 in the center of which there is a discharge conduit 22 leading to the valve V having a discharge conduit 23, the lower end 23-a of which is disposed in a tank T-2.

The valve V has a horizontally disposed cylindrical casing 24 (Figs. 4 and 5) into which the superior conduit 22 discharges and from which the inferior conduit 23 discharges, with suitable end closures 25 in which is suitably journaled a rotatable shaft 26 having an end portion 26-a (Figs. 5–8) extending through a packing gland 27 (Figs. 2 and 5) exteriorly of casing 24. The shaft 26 has mounted thereon four division members 28 (Fig. 4), each having an arcuate portion 28-a on the periphery of shaft 26 and a pair of walls 28-b radial to the axis of shaft 26 and normal to one another. The members 28 are keyed on the shaft 26 by keys 29 fitted in key-ways 30 in the shaft 26. Blades 31 of suitable material, such as rubber, are interposed between radial walls 28-b of adjacent members 28 (Fig. 4) and the parts are mutually fastened by bolts or rivets 32 (Fig. 5). The outer edges 31-a of the blades 31 are disposed in wiping contact with the inner face of the casing 24, and the ends 31-b of the blades 31 are disposed in wiping contact with the inner faces of the closures 25 (Fig. 5).

The portion 26-a of the shaft 26 has fixed thereon a ratchet disc 33 (Figs. 6, 7 and 8) by a set-screw 33-a. Co-acting with the disc 33 there is a pawl 34 pivoted in arms 35, 35-a rockably carried on the portion 26-a, and having a pitman 36 oscillated by a motor M-1 (Fig. 1). A collar 37 is loosely mounted on the portion 26-a adjacent arm 35-a (Fig. 7) and arms 35, 35-a and collar 37 are retained against movement axially of shaft 26 by a collar 38 with washer 38-a fixed on portion 26-a adjacent arm 35 and a cap-bolt 39 with washer 39-a mounted in the end of portion 26-a. The collar 37 has a crank-arm 40 (Figs. 6 and 8) integral therewith disposed radially of shaft 26, and extending slightly beyond the periphery of ratchet disc 33 (Figs. 6 and 8). On the outer end of the crank-arm 40, there is a bracket 41 (Fig. 8) disposed parallel with the shaft 26 and carrying an arcuate shield 42 concentric with disc 33 and disposed about the periphery of the disc 33 (Fig. 6). The collar 37 has a second crank-arm 43 normal to arm 40, collar 37 and arms 40 and 43 constituting a bell-crank pivoted on the shaft 26 (Fig. 6). This bell-crank is actuated to adjust the shield 42 relative to the disc 33 by a pitman 44 pivoted on the end of the crank-arm 43 and oscillated by a suitable regulator R (Figs. 1 and 3).

The regulator R shown in the drawings is the device disclosed in U. S. Patent Number 2,049,549, and functions as described in said patent. The pitman 44 is suitably attached to the power piston rod 45 of regulator R (Fig. 1) which is oscillated by a double-acting piston (not shown) in a cylinder 46, by pressure fluid supplied through pipes 47 and 48 to the ends of the cylinder 46, respectively, from a valve mechanism 49 (Fig. 3). The pressure fluid is circulated to and from mechanism 49 through inlet and exhaust pipes 50 and 51 by a suitable pump 52. The valve mechanism 49 is responsive to movements of a diaphragm 53 which is mounted in a casing 54 connected by an air pipe 55 with the upper end of the auxiliary tank T-1 which is sealed by a cover 55-a.

It is to be understood that the discharge pipe 3 for the underflow product of tank T and the air pipe 55 for the regulator R pass through the cover 55-a of the tank T-1 and that this construction provides a space in the tank T-1 between the cover 55-a and the water-line W-1 of the underflow product in the tank T-1, in which space air is trapped under variable pressure exerted on the air by the underflow product.

The tank T-2 is provided with a reservoir 56 to which water is supplied for tank T-2 by a supply pipe 57 having a valve 58 controlled by a float 59 in a well 60 in the reservoir 56. It will be noted (Fig. 1) that the discharge conduit 23 has its end 23-a disposed below the water-line W in the tank T-2 maintained by functioning of the float 59, valve 58 and pipe 57, so that the open end 23-a of the conduit 23 is constantly submerged in the water in the tank T-2. A suitable drag-line conveyor 61 is provided in the tank T-2 for removing from the tank T-2 the solids discharged from the tank T-1 by the valve V into the tank T-2.

Having described the details of construction of my improved apparatus, I will now describe its use and operation in the practice of the process. The tanks T, T-1 and T-2 are supplied with water, the first two by pipe 16 and the last by pipe 57. The mixed materials are fed into the tank T through chute 20 and its feed wells 20-a. The impeller head on the shaft 7, in the casing 5, being actuated by the motor M, induces a flow of the water in the tank T into the open end 6 of the casing 5 and, therefrom, through the pipe 8, the head 9 and the pipes 10 to the nozzles 11, back into the tank T. As is well-known, the emission of the liquid under pressure from the nozzles 11 causes rotation of head 9 thereby causing, through shaft 12, rotation therewith of head 13, pipes 14 and nozzles 15 in the tank T-1.

The circulation of the water through tank T as above described creates an upwardly flowing current causing the hydraulic classification of the mixed materials fed into the tank T, the overflow product passing out of the tank T through the launder 1 and the underflow product passing out of the tank T through the discharge pipe 3 into the auxiliary tank T-1.

By suitable adjustment of the valve 17 in the pipe 16, water is supplied through the pipe 16 in regulated amount through the head 13 and pipes 14 to the nozzles 15 in the tank T-1 creating a second upwardly flowing current causing hydraulic classification of the mixed materials comprising the underflow product of the tank T fed into the tank T-1. The overflow product from the tank T-1 returns through the pipe 18 to the upper part of the tank T for retreatment therein.

It is obvious that the removal of the overflow product from the tank T and the middling overflow product from the tank T-1 produces a concentrated underflow product which settles from the tank T-1 through its discharge conduit 22 to the valve V. The members 28 of the valve V, rotated by the motor M-1, pitman 36, pawl 34 and ratchet disc 33, convey the settled product from the conduit 22 through the casing 24 to the discharge conduit 23 for emission into the tank T-2.

It is to be particularly noted that, by reason of the peculiar character and relation of its parts, the valve V functions to discharge measured fractions of the product from the tank T-1 in such a manner that the discharged solids are replaced by water to effectually prevent ingress of air to tanks T-1 and T, avoiding any interference to the hydraulic classification. As the solids settle through conduit 22 into the valve "pockets"

formed by the members 28, water is forced therefrom into tank T-1. When the solids are discharged from the "pockets" into the conduit 23, the "pockets" emptied of solids are filled with water, due to the submergence of the end 23-a of the conduit 23 below the water-line W in the tank T-2.

The rate of discharge of the solids through the valve V is dependent upon the relation of the shield 42 and the ratchet disc 33 since the oscillation of pawl 34 by motor M-1 is uniform and the position of the shield 42 determines the effective stroke of the pawl 34, viz. the number of teeth of the ratchet disc 33 between each "bite" of the pawl 34, and consequently the degree of rotation of the "pockets" in each time interval.

It is obvious from Fig. 1 that the shield 42 is positioned by functioning of the regulator R as described in said Patent Number 2,049,549, which is controlled in response to the air pressure existing in pipe 55 and the space between the waterline W-1 and the cover 55-a of the tank T-1.

Having described my invention, what I claim is:

In an apparatus for separating mixed materials, the combination of a tank having a discharge port in its lower end; means in said tank to cause an upwardly flowing current of water for segregating an underflow product for discharge through said port; a second tank having a cover, an intake conduit passing through said cover and connected to said discharge port, and an underflow port, said second tank being so sealed that during operation of the apparatus air under variable pressure is trapped between said cover and the underflow product in said second tank, the pressure of said air depending upon the pressure exerted on the air by said underflow product; means in said second tank to segregate from said product a second underflow product of said materials, for discharge by gravity from said second tank through said underflow port; a valve adapted to control said second discharge by successively removing from said second tank measured fractions of said second underflow product; means for operating said valve; and means for controlling said operating means, said controlling means being responsive to variations in the pressure of the air trapped in said second tank.

References Cited in the file of this patent

UNITED STATES PATENTS

| Number | Name | Date |
|---|---|---|
| 891,610 | Duncan | June 23, 1908 |
| 1,217,826 | Reap | Feb. 27, 1917 |
| 1,350,647 | Elmore | Aug. 24, 1920 |
| 1,686,435 | Chance | Oct. 2, 1928 |
| 1,894,020 | Chance | Jan. 10, 1933 |
| 2,119,006 | Chapman | May 31, 1938 |
| 2,132,378 | Bird | Oct. 11, 1938 |
| 2,270,696 | Brentz | Jan. 20, 1942 |
| 2,288,744 | Remick | July 7, 1942 |
| 2,425,551 | McKay | Aug. 12, 1947 |

FOREIGN PATENTS

| Number | Country | Date |
|---|---|---|
| 210,613 | Great Britain | Feb. 7, 1924 |
| 210,663 | Great Britain | Feb. 7, 1924 |